July 30, 1968  G. D. HERRING  3,394,609
COAXIAL GEARING ARRANGEMENT
Filed June 15, 1966  2 Sheets-Sheet 1

INVENTOR
GEORGE D. HERRING
BY Richard H. Smith
ATTORNEY

July 30, 1968  G. D. HERRING  3,394,609
COAXIAL GEARING ARRANGEMENT
Filed June 15, 1966   2 Sheets-Sheet 2

United States Patent Office 3,394,609
Patented July 30, 1968

3,394,609
COAXIAL GEARING ARRANGEMENT
George D. Herring, Rochester, Minn., assignor to International Business Machines Corporation, Armonk, N.Y., a corporation of New York
Filed June 15, 1966, Ser. No. 557,785
12 Claims. (Cl. 74—330)

ABSTRACT OF THE DISCLOSURE

A gear assembly including a cylindrical bearing surface and a gear mounted within the bearing with the gear outer periphery bearing upon and supported by the bearing surface. Compact transmission of separate rotations is effected by a concentric tube set each element of which carries a gear adjacent each end with the peripheral surfaces thereof journaled within a bearing tube, which tube presents slotted portions affording access to the gears.

---

This invention relates to a coaxial gearing arrangement and, more particularly, to an arrangement for compactly transmitting a plurality of separate angular movements such as may be experienced, for example, by the digit wheels of the accumulating mechanism employed in a cash register, desk calculator, accounting tabulator or the like.

In devices such as cash registers it is usually necessary to transmit a plurality of separate angular movements from one portion of the machine to another. An example of this is in transmitting the separate rotations of the digit wheels of the accumulating mechanism to output devices such as print wheels, display wheels, or the like. It has become common practice to conserve space in transmitting these movement by employing a coaxial gearing arrangement including a plurality of input gears connected to a corresponding plurality of output gears by means of concentric tubes. The two outermost gears of such an arrangement are rotatably connected by a central shaft, the two gears inwardly adjacent these gears are rotatably connected by a tube concentric about the central shaft and the two innermost gears are rotatably connected by a concentric tube which surrounds all the intermediate connecting tubes as well as the central shaft.

Such coaxial gearing arrangements as are known to the prior art take two forms. First, there is the type wherein the central shaft as well as each concentric connecting tube is separately journaled in a pair of bearings. This arrangement reduces the compactness of the design since the individual bearing members must be positioned between the gears, thus preventing the desired close gear spacing. This arrangement further suffers from a cost standpoint since the provision of a pair of individual bearings for each gear set is expensive and the process of assembly and bearing alignment is time consuming.

The second form of prior art arrangement allows close spacing of the gears by providing a fixed mounting shaft or pair of mounting pintles about which the two outermost gears are journaled. The remaining gear sets are journaled about the connecting tube of the adjacent gear set. The primary disadvantage of this arrangement lies in the fact that the journal clearances necessary for rotation of the gear sets accumulate with the result that the innermost sets experience a substantial amount of play about the axis of the system. This creates a considerable amount of backlash between those gear sets and the teeth on the input and output members with which they mesh. This means that very close tolerances must be maintained between the components of the arrangement. If this is not done, the arrangement must be limited to a small number of gear sets. The first alternative is undesirable from a cost standpoint and the second suffers from reduced utility.

It is therefore an object of the present invention to provide an improved coaxial gearing arrangement.

Another object is to provide an improved coaxial gearing arrangement that permits assemblage of a large number of gear sets without introducing backlash into the system.

Still another object is to provide a coaxial gearing arrangement wherein only one or two bearing surfaces are required to rotationally support a large number of gear sets.

Yet another object is to provide a coaxial gearing arrangement of optimum compactness wherein the tolerances between the components thereof is not a factor in determining the number of permissible gear sets.

Yet a further object is to provide a coaxial gearing arrangement permitting a large number of gear sets to be assembled with optimum compactness and at an extremely low cost.

In accordance with the invention, each gear is rotationally supported at its outer periphery by a bearing surface that substantially surrounds the entire gear. Thus, when the input and output gears of the arrangement are of the same diameter, a single bearing surface, which may be the inside surface of a tube, is employed for all of the gears. When the input and output gears are of different diameters, two bearing surfaces are required.

Since the axis of rotation of all gears is established from a common bearing surface contiguous with the outer peripheries thereof, shaft bearings are not required and the gears may be spaced as close to one another as desired. Further, this arrangement eliminates the "accumulating" of clearances and backlash is not a problem even when large numbers of gear sets are employed.

In accordance with a second aspect of the invention, each of the gears is provided with a peripheral flange which is flush with the top lands of the gear teeth. This permits portions of the bearing wall to be removed to allow access to the gear teeth while still maintaining 360 degree bearing support for each gear. Further, the flanges of each gear set coact with the input and ouput members, e.g., racks, to laterally constrain the gear set. This alleviates any necessity for spacers, shims, washers, cotter pins, or the like.

The foregoing and other objects, features and advantages of the invention will be apparent from the following more particular description of preferred embodiments of the invention, as illustrated in the accompanying drawings.

Figure 1A:
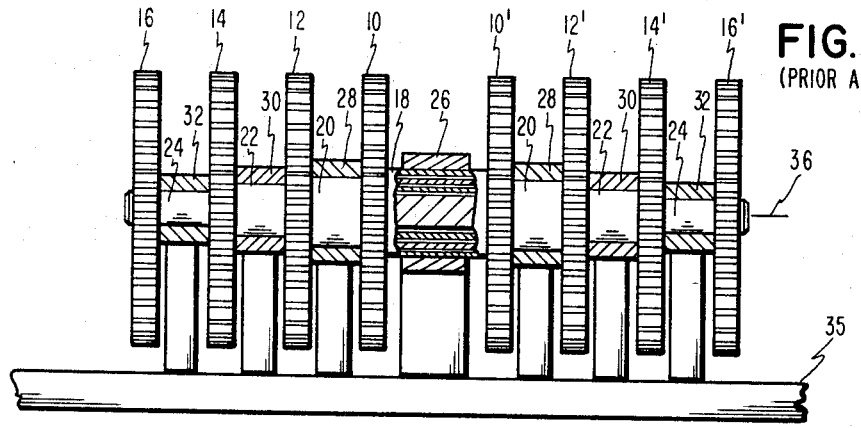
FIGS. 1a and 1b are elevational views partially sectioned illustrating the two types of coaxial gearing arrangements of the prior art.
Figure 1B:
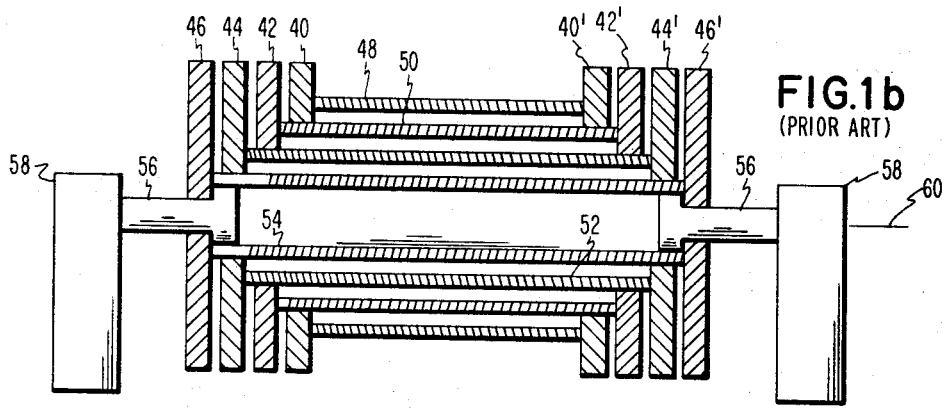

Referring now to FIGS. 1a and 1b, the two prior art schemes briefly discussed above are explained in greater detail.

In the arrangement of FIG. 1a, four coaxially mounted gear sets 10–10', 12–12', 14–14' and 16–16' are shown. The set 10–10' is rotatably interconnected by a tube 18 journaled in bearing member 26. The set 12–12' is interconnected by a tube 20 having an outside diameter small enough to provide rotational clearance with the inside diameter of tube 18. Tube 20 is journaled in a pair of bearings 28. Similarly, sets 14–14' and 16–16' are interconnected by tubes 22 and 24 which are rotatably supported in bearings 30 and 32, respectively. Each of the bearing members is suitably supported to some fixed reference point such as base member 35. Thus, rotation of any one of the input gears, such as gear 16', causes like rotation of the corresponding output gear 16.

It can be seen that the arrangement of FIG. 1a adequately fixes the axis of rotation of each gear set so that it is co-linear with the center axis 36 of the system, therefore permitting close control of the backlash present between each of the gears and the input or output member (not shown) with which it meshes. However, it is readily apparent that close lateral spacing of the gears is not possible due to the required presence of the bearing members between the gears.

As shown in FIG. 1b, the second prior art arrangement allows close spacing between the gears of the gear sets 40–40', 42–42', 44–44' and 46–46'. This is done by journaling the outer gear set 46–46' about a pair of mounting studs or pintles 56 which are supported in frame members 58. The gears 46 and 46' are interconnected by a tube 54. The next innermost gear set 44–44' is journaled about tube 54 and is interconnected by a tube 52. Similarly, the inner gear sets 42–42' and 40–40' are journaled about the tubes 52 and 50, respectively, and are themselves interconnected by tubes 50 and 48, respectively.

Since in this arrangement some rotational clearance must exist between each gear and the surface about which it is journaled, it can be seen that the effect of these clearances is cumulative with respect to the axis of rotation of gear set 40–40'. That axis is not fixed, but instead is allowed to play about the axis 60 of the system by an amount equal to the total of the clearances. The same is true to a lesser extent of each of the other sets except 46–46'. This play creates appreciable backlash between the gears and their respective input and output members (e.g., racks). It is thus seen that the total number of gear sets permissible in the arrangement of FIG. 1b is limited in accordance with the maximum backlash that can be tolerated in the system.

*Detailed description of preferred embodiments*

Figure 2:
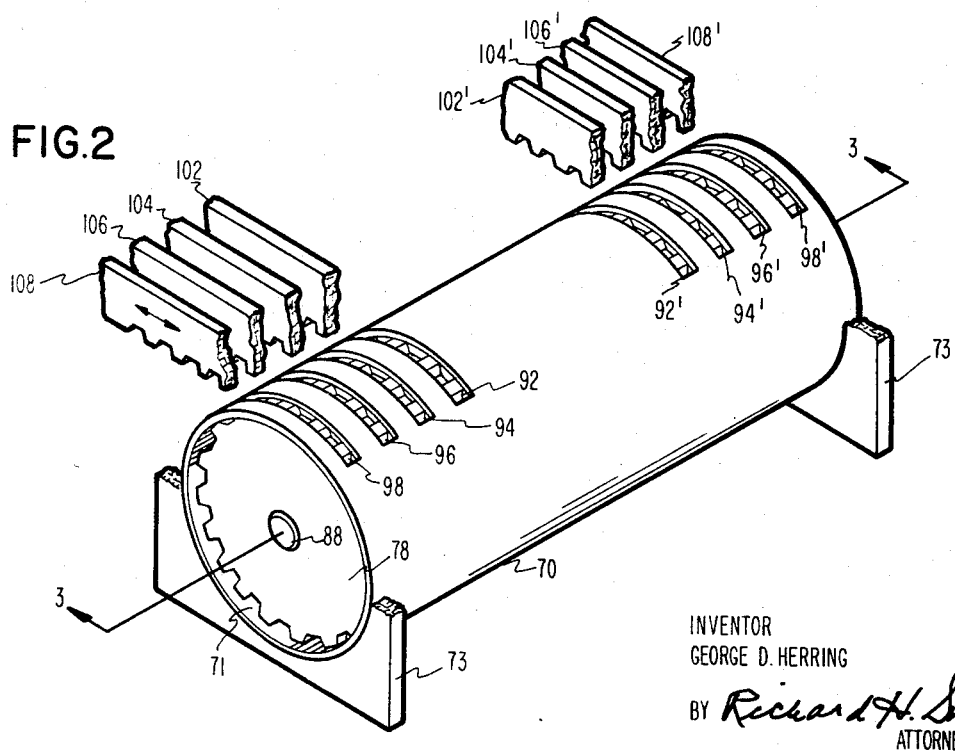
FIG. 2 is a perspective view showing the coaxial gearing arrangement of the invention. For clarity of illustration, the input and output racks which mesh with the coaxial gears are broken away.
Figure 3:
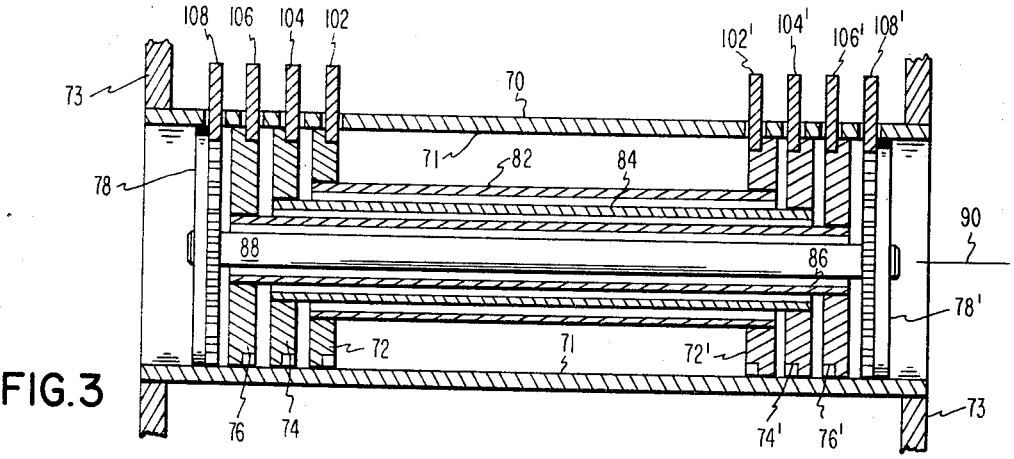
FIG. 3 is a partial sectional view taken along the line 3—3 of FIG. 2.

A preferred embodiment of the invention is illustrated in FIG. 2. There, four gear sets are rotatably supported inside a single bearing member 70. Bearing 70 is in the form of a tube supported by frame members 73. The internal cylindrical surface 71 of bearing 70 provides the actual bearing surface for the gears. As shown in FIG. 3, this surface coacts with the outer periphery of each of the gears 72, 72', 74, 74', 76, 76', 78 and 78' and establishes the center of rotation of each with respect to the center axis 90 of the system.

Gear set 72–72' is rotatably interconnected by tube 82 while sets 74–74', 76–76' and 78–78' are interconnected by tubes 84, 86 and 88, respectively.

Pairs of slots 92–92', 94–94', 96–96' and 98–98' (FIG. 2) are provided in the member 70 to permit the gears to mesh with the four sets of input-output racks 102–102', 104–104', 106–106' and 108–108'. Each slot subtends an arc of approximately 90 degrees to provide proper meshing of the racks and gears free of interference with member 70. Since the racks are mounted for horizontal linear reciprocation, movement of, for example, input rack 108' is transferred to output rack 108 through gear set 78–78'. Since the number of teeth on the gears 78 and 78' correspond on a one-to-one basis, the linear motion is transferred from the input rack to the output rack on a one-to-one basis.

As previously discussed, an exemplary application of the gearing arrangement depicted in FIGS. 2 and 3 is in a cash register wherein the input racks 102', 104', 106' and 108' are driven by the digit wheels of an accumulator mechanism while output racks 102, 104, 106 and 108 operate to drive output devices such as print wheels, display wheels, or the like.

Figure 4:
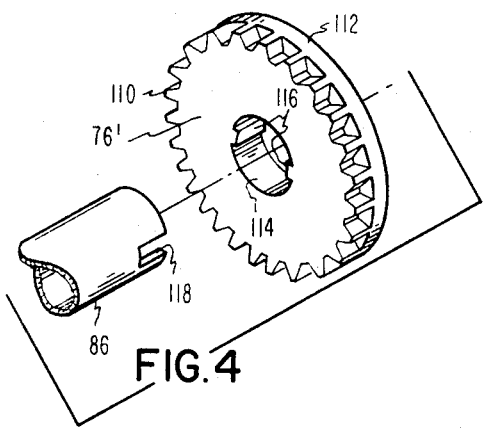
FIG. 4 is a perspective, exploded view showing the details of the connection between a gear and its concentric tube.
Figure 5:
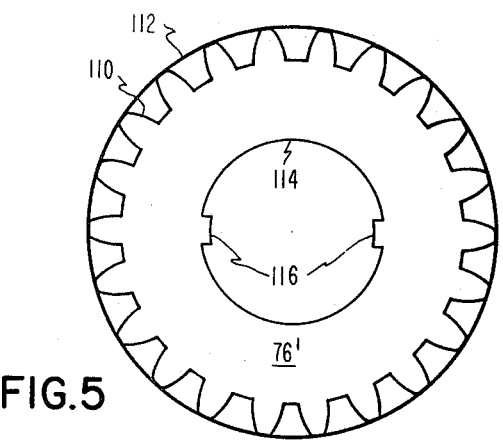
FIG. 5 is a side elevation view of the gear shown in FIG. 4.

The details of the gears are shown in FIGS. 4 and 5 wherein gear 76', which is taken as an example, is illustrated. The gear is provided with a toothed portion 110 and a flanged portion 112. The purpose of flange 112 is, first, to provide the gear 76' with substantially 360 degrees of bearing contact with bearing surface 71 and, second, to provide, in combination with the similar flange on gear 76, lateral constraint for the gear set 76–76'. It should be realized that the first-mentioned function, while desirable, is not mandatory since the top lands of the gear teeth of toothed portion 110 are in bearing contact with the surface 71 through an arc of approximately 270 degrees, which is sufficient to provide adequate rotational bearing support for the gear. However, in an application where the access slots in the member 70 would have to subtend a greater arc, the function of the flange 112 in providing bearing support would become more necessary.

The second-mentioned function of the flange 112 may be understood with reference to FIG. 3. There it can be seen that the flange on gear 76' prevents gear set 76–76' from moving to the left due to the presence of rack 106'. Similarly, the gear set is prevented from rightward movement due to interference of the flange on gear 76 with rack 106.

The flanges 112 thus eliminate the need for spacer shims, washers or other means of laterally constraining the gear sets and renders the gearing arrangement of the invention of optimum compactness.

As further shown in FIGS. 4 and 5, a preferred method of fixing the gears to their respective connecting tubes is by virtue of a press or interference fit. The diameter of the center hole 114 in the gear is slightly less than the O.D. of tube 86. A pair of internal lugs 116 coact with slots 118 in the end of the tube to positively prevent any relative rotation between the tube and the gear.

It has been found that bearing 70 may be fabricated from steel sheet stock approximately 0.060 inch thick rolled on a mandrel into a tube of diameter 1.498+.002 −.000 inch. With this tube I.D., gears having an O.D. 1.49+.000 −.008 inch have been found to perform satisfactorily. The gears may be made from any desired material such as cast, machined or sintered metal, molded plastic, etc.

Figure 6:
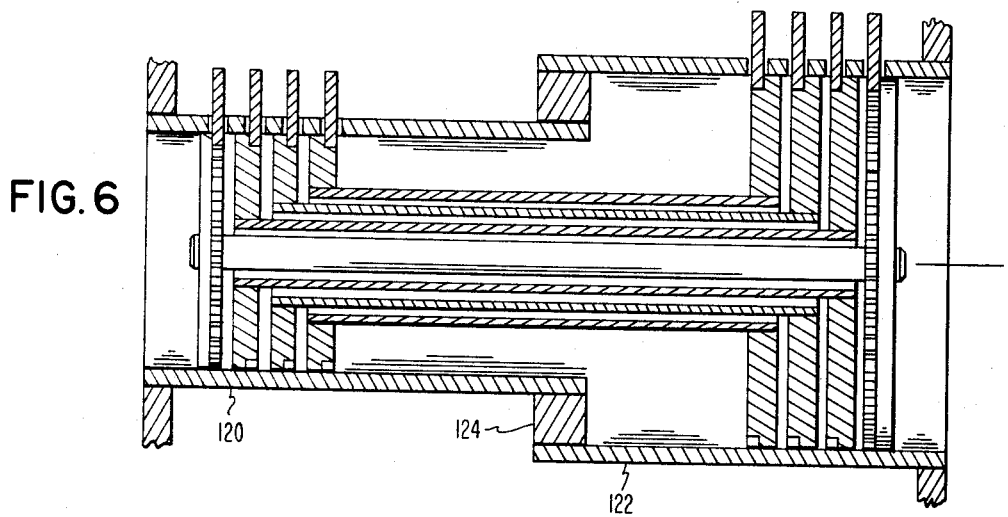
FIG. 6 is an elevational view, partially sectioned, illustrating a modification of the arrangement shown in FIGS. 2 and 3.

A modification of the gearing arrangement of FIGS. 2 and 3 is shown in FIG. 6. The only difference between the arrangement of FIG. 6 and that of FIG. 3 is that the former has input gears of greater diameter than the output gears. Consequently, a pair of bearing tubes 120 and 122 having appropriate inside diameters are provided. The bearing members 120 and 122 are held concentric with one another by a spacer annulus 124.

While the invention has been particularly shown and described with reference to preferred embodiments thereof, it will be understood by those skilled in the art that the foregoing and other changes in form and detail may be made therein without departing from the spirit and scope of the invention.

I claim:

1. A gear assembly comprising, in combination:
   a bearing member having a cylindrical bearing surface; and
   a gear mounted for rotation in said bearing member, the outer periphery of said gear bearing upon and supported by said bearing surface.

2. The gear assembly set forth in claim 1 wherein said bearing member is a cylindrical tube.

3. The gear assembly set forth in claim 2 wherein said tube has a portion of its wall removed to permit access to the teeth of said gear.

4. The gear assembly set forth in claim 1 wherein said gear comprises:
   a toothed portion; and
   a flange portion axially adjacent said toothed portion, said flange portion having a peripheral surface which is flush with the top lands of said toothed portion.

5. The gear assembly set forth in claim 4 wherein said bearing member is a cylindrical tube having a portion of its wall adjacent said gear teeth removed to permit access to said teeth, the portion of said wall adjacent said peripheral surface of said flange portion being substantially fully contiguous therewith.

6. In an apparatus for transmitting angular motion, the combination comprising:
   a bearing member having a cylindrical bearing surface;
   a first gear mounted for rotation in said bearing member, the outer periphery of said first gear bearing upon said bearing surface;
   a second gear mounted for rotation in said bearing member and having its outer periphery also bearing upon said bearing surface; and
   a shaft interconnecting said first and second gears.

7. The apparatus set forth in claim 6 wherein said bearing member is a cylindrical tube.

8. The apparatus set forth in claim 7 wherein said tube has portions of its wall removed to permit access to the teeth of said gears.

9. The apparatus set forth in claim 6, further comprising:
   third and fourth gears mounted for rotation in said bearing member with their outer peripheries bearing upon said bearing surface, said gears being located between said first and second gears; and
   a tube interconnecting said third and fourth gears, said tube being concentric with said shaft.

10. The apparatus set forth in claim 9 wherein said bearing member is a cylindrical tube having portions of its wall removed to permit access to the teeth of said gears.

11. In an apparatus for transmitting angular motion, the combination comprising:
   a first bearing member having a cylindrical bearing surface;
   a first gear mounted for rotation in said first bearing member, the outer periphery of said gear bearing upon said bearing surface;
   a second bearing member having a cylindrical bearing surface;
   a second gear mounted for rotation in said second bearing member, the outer periphery of said second gear bearing upon said bearing surface of said second bearing member; and
   a shaft interconnecting said first and second gears.

12. The apparatus set forth in claim 11 wherein said bearing members are cylindrical tubes having portions of their walls removed to permit access to the teeth of said gears.

References Cited
UNITED STATES PATENTS
1,015,477   1/1912   Conant _____ 74—801
2,919,682   1/1960   Chien-Bor Sung _____ 74—422

FRED C. MATTERN, JR., *Primary Examiner.*

H. S. LAYTON, *Assistant Examiner.*